United States Patent
Pyasetskyy et al.

(10) Patent No.: US 11,520,618 B2
(45) Date of Patent: Dec. 6, 2022

(54) SYSTEM AND METHOD FOR THE SEGMENTATION OF A PROCESSOR ARCHITECTURE PLATFORM SOLUTION

(71) Applicant: PayPal, Inc., San Jose, CA (US)

(72) Inventors: Roman Pyasetskyy, San Francisco, CA (US); Joshua Allen, Alameda, CA (US); Archana Murali, Freemont, CA (US); Joshua Van Blake, Walnut Creek, CA (US); Gaetan Le Brun, Albany, CA (US); Ernesto Alejandro Menendez Castillo, Guatemala (GT); Evgeny Stukalov, Walnut Creek, CA (US); Myo Ohn, Hayward, CA (US); Kirankumar Badi, Dublin, CA (US); Rashmi Prakash, Austin, TX (US); Vinit Agarwal, Fremont, CA (US); Keith Gorman, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 225 days.

(21) Appl. No.: 16/728,920

(22) Filed: Dec. 27, 2019

(65) Prior Publication Data

US 2021/0200576 A1 Jul. 1, 2021

(51) Int. Cl.
*G06F 9/38* (2018.01)
*G06F 9/46* (2006.01)
*G06F 9/54* (2006.01)

(52) U.S. Cl.
CPC ............ *G06F 9/466* (2013.01); *G06F 9/3836* (2013.01); *G06F 9/541* (2013.01)

(58) Field of Classification Search
CPC ......... G06F 9/466; G06F 9/3836; G06F 9/541
See application file for complete search history.

(56) References Cited

U.S. PATENT DOCUMENTS

| | | | |
|---|---|---|---|
| 2003/0177028 A1* | 9/2003 | Cooper ................ | G06Q 20/108 705/42 |
| 2005/0160434 A1 | 7/2005 | Tan | |
| 2007/0150480 A1* | 6/2007 | Hwang .................. | G06Q 50/32 |

(Continued)

OTHER PUBLICATIONS

Lowry et al. Online Payment Gateways Used to Facilitate E-Commerce Transactions and Improve Risk Management. [online] Association for Information Systems., pp. 1-48. Retrieved From the Internet <https://papers.ssrn.com/sol3/papers.cfm?abstract_id=879797> (Year: 2006).*

(Continued)

*Primary Examiner* — Emerson C Puente
*Assistant Examiner* — Jonathan R Labud
(74) *Attorney, Agent, or Firm* — Haynes and Boone, LLP (57) ABSTRACT

Aspects of the present disclosure involve systems, methods, devices, and the like for segmentation of the processor architecture platform. In one embodiment, a system and method are introduced which enable the use of a segmented platform in an extended network. The segmented platform is introduced for processing using standardized plugins enabling the use of processing and services available at the segmented network. In another embodiment, processing on the segmented platform can include the integration of microservices for the completion of the transaction.

20 Claims, 7 Drawing Sheets

(56) References Cited

U.S. PATENT DOCUMENTS

2013/0179348 A1* 7/2013 Crofts ................. G06Q 20/322
705/44
2018/0084085 A1* 3/2018 Shanmugasundaram ....................
H04L 12/2818

OTHER PUBLICATIONS

United States Patent and Trademark Office, International Search Report and Written Opinion for PCT/US2020/065308, dated Mar. 19, 2021, 8 pages.

* cited by examiner

SYSTEM AND METHOD FOR THE SEGMENTATION OF A PROCESSOR ARCHITECTURE PLATFORM SOLUTION

TECHNICAL FIELD

The present disclosure generally relates to processor architecture platforms and more specifically, to the segmentation of the processor architecture platform.

BACKGROUND

In the advent of technology, industry has moved to the use of electronic devices and communications for processing transactions. As such, users are placing heavy reliance on the use of such devices for payment processing, item purchases, service requests, online browsing, money transfers, and the like. Conventionally, the processing of such transactions requires the download and integration of an application for each activity. For example, if a user wants to purchase an item online, an account with a first entity is needed. As another example, if the same user later wants to send money to family internationally, yet another account with another entity is needed. Unfortunately, such need for multiple accounts can be frustrating and time consuming for a user. Additionally, if the entity is interested in adding the money transfers capability to an existing purchasing platform, implementation and integration of a new platform would be needed, a process that can include many redundancies and require the use of many resources and funding. As such, it would be beneficial to create a system with the capacity to work as a plugin segmented platform for use in an extended network.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for segmentation of the processor architecture platform. In one embodiment, a system and method are introduced which enable the use of a segmented platform in an extended network. The segmented platform is introduced for processing using standardized plugins enabling the use of processing and services available at the segmented network. In another embodiment, processing on the segmented platform can include the integration of microservices for the completion of the transaction.

Figure 1A:
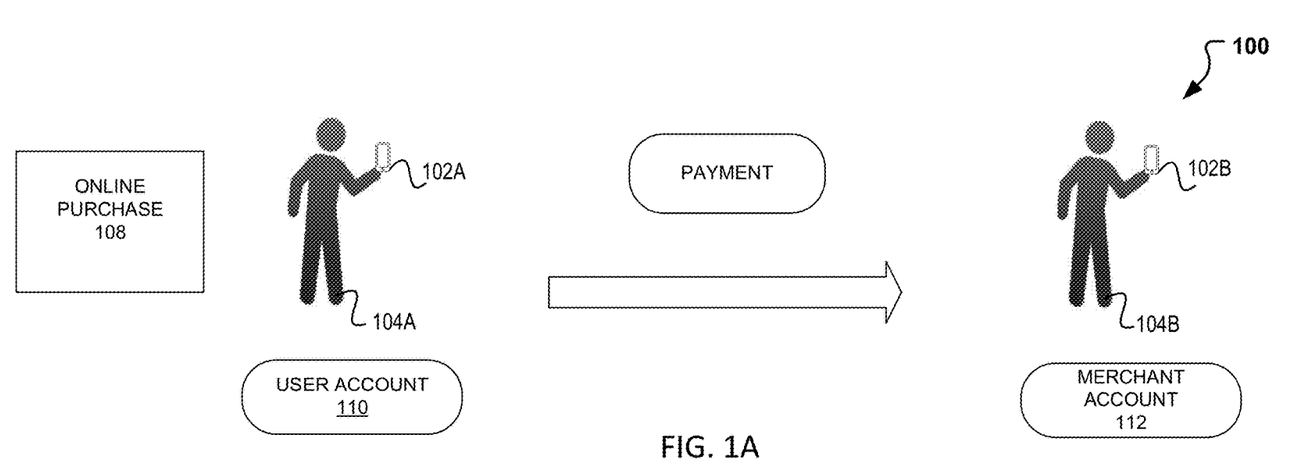
FIGS. 1A-1B illustrates exemplary diagrams of user transaction processing using various processing entities.
Figure 1B:
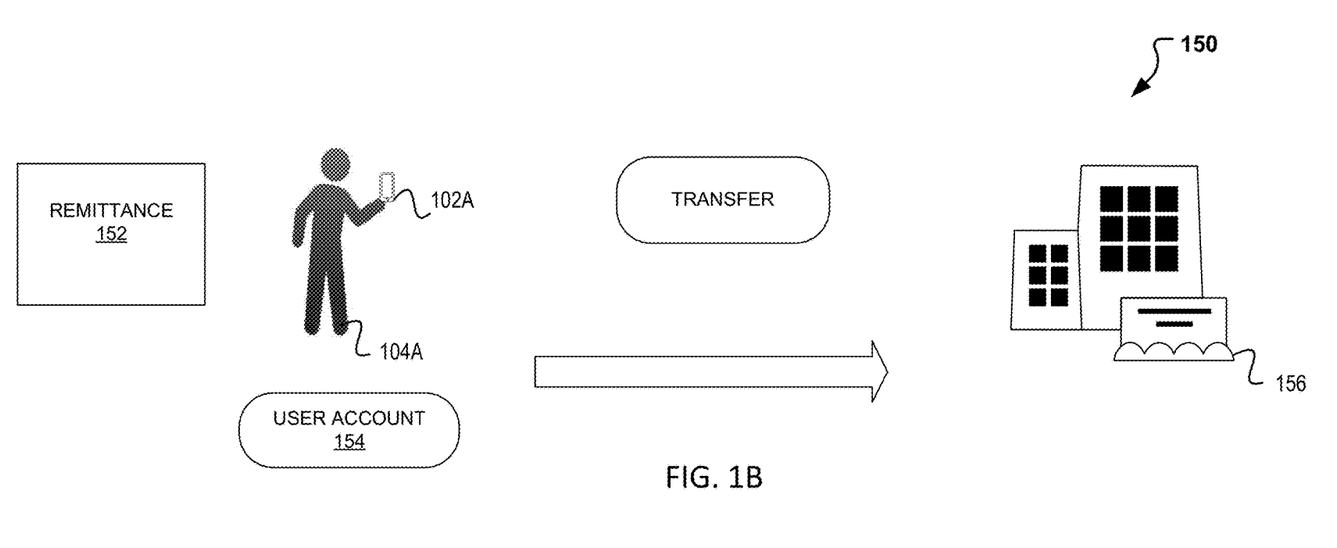

In the advent of technology, industry has moved to the use of electronic devices and communications for processing transactions. As such, users are placing heavy reliance on the use of such devices for payment processing, item purchases, service requests, online browsing, money transfers, and the like. Conventionally, the processing of such transactions requires the download and integration of an application for each activity. FIGS. 1A-1B illustrates exemplary diagrams of user transaction processing using various processing entities. In particular, FIG. 1A illustrates a first transaction 100 including an online purchase activity. For this online purchase activity, as illustrated a user 104A is interacting with a device 102 for completing an online purchase 108. The device 102 can include any device including a tablet, iPad, cell phone, smartphone, laptop, desktop, vehicle, internet of things (IoT) device, merchant device or the like. For exemplary purposes, device 102 is a smartphone, and device 156 is system or other external entity communicating with the application associated with an account 110, 112. The device 102 may be used for web browsing, video streaming, bill payments, money transfers, and online purchases. Additionally, the device 102 may be equipped with applications that enable the user to make purchases and transfers using payment provider applications and/or a digital wallet. Further, the device 102 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. The communication can also enable to communication of transactional activity. For example, transactional activity may be the online purchase 108.

For completion of the online purchase 108, a third-party service provider and/or financial service provider may be involved in the payment from a user account 110 associated with the user 104A to a merchant account 112 which may be associated with a corresponding merchant device 102B and/or other user 104B. In this exemplary transaction, as illustrated, the user 104A and the other user 104B (merchant here), need to create an account in order to complete the transaction to function within the current entity's framework. Additionally, the user 104 is restricted by the capabilities of the current entity and its platform. For example, consider a payment provider, a payment provider has the capability, integration, and framework needed to enable users 104 to transfer funds and make purchases. However, if the user 104A is instead interested in performing another transaction outside the capacity of the current entity, then the user is required to access, integrate, and transact using a different entity.

For example, consider FIG. 1B, wherein a user 104A is interested in performing a second and different transaction 150. In particular consider a user 104A interested in completing a (international) remittance 152. For the remittance, the user 104B may again need a distinct user account 154 with the separate entity or payment service provider to perform this activity. Because the user 104B is performing a cross-border remittance, a separate entity with its own platform may be needed for the transfer of money to another country. This other platform may have and include the system architecture to enable the processing necessary to enable the transfer across borders such that cash pick up or delivery is at a separate location 156 (e.g., store, bank, entity, or other institution). As such, each entity providing the activity has its own platform for performing and executing on it.

Unfortunately, such need for multiple accounts can be frustrating and time consuming for a user. Additionally, if the entity is interested in adding the money transfers capability to an existing purchasing platform, implementation and integration of a new platform would be needed, a process that can include many redundancies and require the use of many resources and funding. To mitigate the need for such redundancies and creation of separate platforms, in one embodiment, an enterprise may be created as a super network with the capacity to work as a plugin framework for use with other architecture platforms. That is to say, a system that is able to add a segmented processor architecture platform such that the segmented architecture platform's capabilities are accessible for use by and to other tenants.

Figure 2:
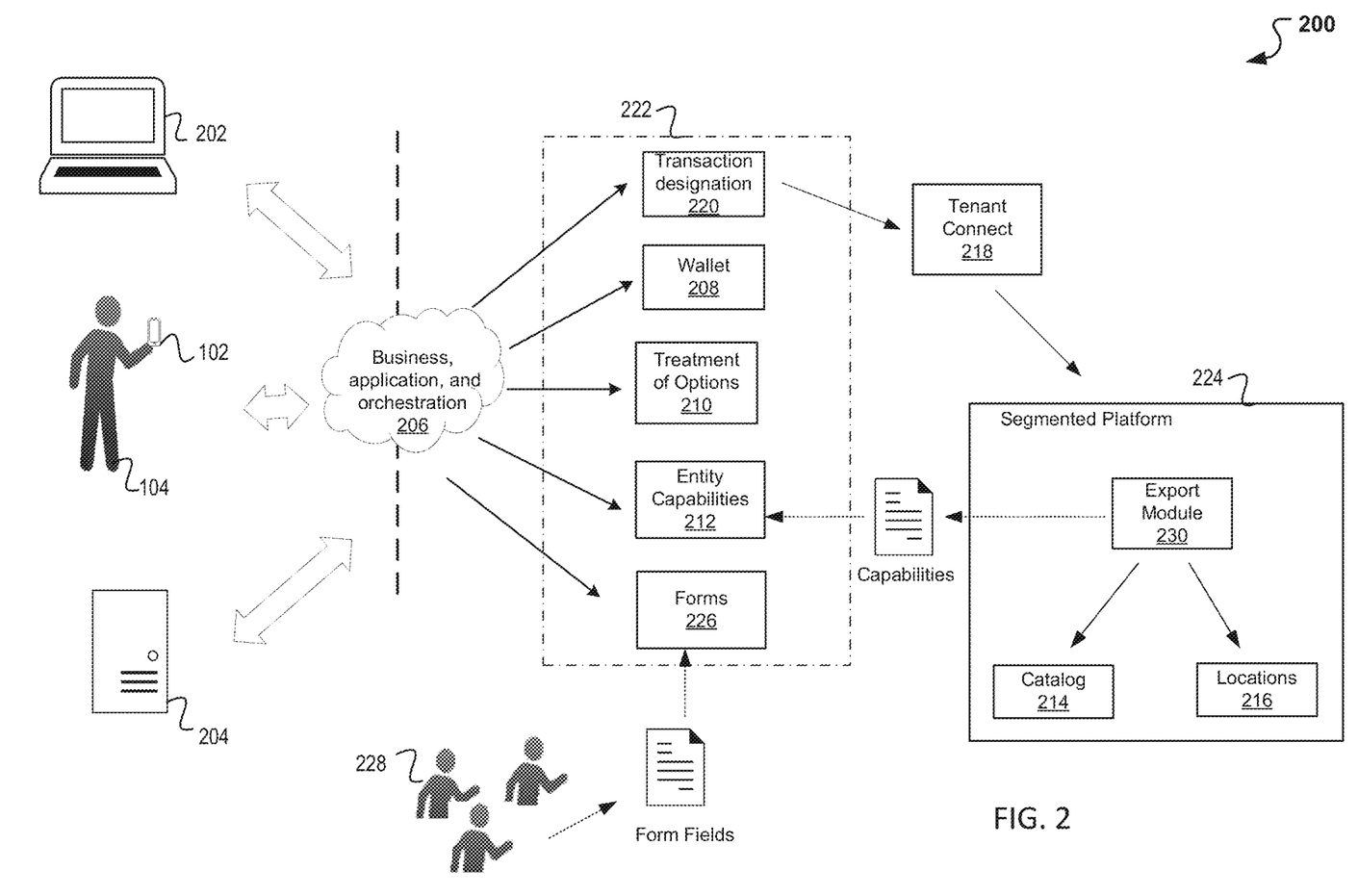
FIG. 2 illustrates exemplary network system used in conjunction with segmented subnetwork platforms for processing transactions.

To exemplify the use of such system, consider FIG. 2. FIG. 2 illustrates exemplary enterprise 200 used in conjunction with segmented subnetwork platforms for processing transactions. In particular, FIG. 2 illustrates an enterprise system 200 with the use and addition of a segmented platform 224 for use in conjunction with an extended network system 222. As indicated, oftentimes conventional systems are designed and built around performing specific tasks and activities. As such, enterprise system 200 is introduced illustrating how a financial instrument may be added to an extended network system 222 such that the capabilities of the enterprise system 200 include those of the extended network system 222 and the segmented platform 224.

Returning once again to the exemplary applications of FIGS. 1A-1B, a user 104 communicating with a device 102 is able to perform such activity including online purchases and remittance using the now extended network system 222. Additionally, the transactions may also derive from a personal device 202 and/or other system/entity/or device 204. The transactional data may be any type of transactional data received which could include for example transaction processing and the use of payment platforms. The device 102 and 202-204 can include any device including a tablet, iPad, cell phone, smartphone, laptop, desktop, vehicle, internet of things (IoT) device, or the like. For exemplary purposes, per personal device 202 is a laptop, user device 102 is a smartphone, and device 204 is a system or other external entity communicating with an application and business 206. The device 102 may be used for web browsing, video streaming, bill payments, money transfers, and online purchases. Additionally, the device 102 may be equipped with applications that enable the user to make purchases and transfers using payment provider applications and/or a digital wallet. Further, the device 102 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. The communication can also include the transmission and request for transactional activity. For example, transactional activity may be transmitted to a business or third-party provider 206.

In the transmission of the transactional activity, the device 102, 204-206 can communicate with the application 206. The application 206 can be any application used for transacting. For example, the application 210 can be an application on a device which may receive information including transactional activity. In one embodiment, the application can be an application on a digital wallet, a financial services application, or other third-party provider application capable of processing or enabling a payment transaction. As an illustration consider an application being used to process a payment with a merchant and/or user 104A. In this instance, the device 102, 204-206 is able to communicate with the application 206 for the payment processing. The application 206 having received the information, in addition to processing the transaction, also stores and manages the transactional record and activity associated with the transaction. As such, the application 206 can include the business itself, and the orchestration and transfer service for the request to the appropriate platform, subplatform (e.g., segmented platform 224), or the like for processing.

First, to add the now segmented platform 224 as a plugin to the extended network 222, the capabilities of the segmented platform 224 are transferred to or exported to the extended network 222. As could be understood, each entity will have a set of capabilities associated with its segmented platform 224. For example, a financial instrument or payment provider entity would have bank information and associated capabilities associated with the entity and its affiliates. As such, its capability to plugin and describe them as reference data to the extended network's overall reference platform is performed. For the transfer and share of the capabilities, at the segmented platform 224 a daily export may exist with the data imported into the extended network 222. This daily export may be performed by an export component 230 designed to take the current catalog 214 of capabilities, locations 216, etc., and import them. In one embodiment where a third-party payment provider is the extended network 222 and a payment segmented platform 224 is added, capabilities can include bank capabilities such as the bank capabilities with different banks, branches, routing numbers, location, timing, etc. So, the capabilities of the extended network 222 can include the capabilities of the various segmented platforms 224 added and imported into the extended network 222 and exposed as entire entity capabilities 212.

Further to the capabilities, each segmented platform 224 may maintain and include information about its affiliates or partners in various forms and with varying information. For example, consider an instance where a money transfer segmented platform 224 is now being plugged into an extended disbursement network 222. In this instance, the banking information, the type of information, routing numbers, etc., of the segmented platform 224 maybe distinct from that maintained and used by the extended network 222. As such, a standardized and globally relevant form may be generated and maintained at a forms component or datastore 226 for use by all participants or processors of the extended network 222. To maintain, capture, and determine what information exists and is available at each of the segmented platforms 224, curators 228 may be used to identify the various fields associated with each platform and exposed to the extended network at the forms component or datastore 226. Note that curation may occur manually, electronically, an/or as a combination of both. That is to say, the curators can include various individuals identifying and collecting the fields, can be an automated process wherein the fields are read and determined via machine processing, or the like.

Note that the segmented platform 224 can correspond to any platform associated with an entity for use in transaction processing. In one embodiment, the segmented platform 224 is a financial instrument platform which can bring its financial processing capabilities to the extended network 222. For example, the segmented platform 224 can be a system like Xoom whose system is updated, and dependencies modified to extend its current consumer platform to a disbursement platform (extended network 222) like PayPal. Additionally, or alternatively, the financial instrument or other segmented platform used and plugged in may be added to (if applicable to a wallet 208 for use and reference).

Once the segmented platform has been plugged into the extended network, a transaction may be placed through a processing platform enterprise system 200 which can include and determine the various options and endpoint available that exist now with the inclusion of the segmented platforms 224. Therefore, as a transaction is processed, the bank capabilities for example, that were previously added, are now exposed and available for use. The use of the extended capabilities can also trigger the treatment of a transaction. Treatment which can be determined using at least a treatment options component 210 for determining if a change is to be surfaced. For example, consider a money transfer. This money transfer will necessitate the use of the segmented platform 224, as such, the money transfer may encounter or present various pricing schemes including but not limited to a differing pricing scheme if the transfer will be done and/or available immediately or if a delay will exist.

If a determination is made that the segmented platform 224 is used in the transaction, a transaction designation technology 220 may exist which can enable the interface with the segmented platform 224. An interface component or tenant connect mechanism 218 may then interact with the transaction designation technology 220 to enable the switch and communication with the segmented platform 224. In one embodiment, the interface component or tenant connect mechanism 218 may work as a plugin architecture for the extended network 222. Thus, every segmented platform 224 that gets added to the extended network 222 can be plugged in using a same interface such that any other existing segmented platforms 224 and future acquired platforms may be added to the extended network 222 as a plugin which just slots in. Therefore, as long as the same interface is used the interface component or tenant connect mechanism 218 can point at the added segmented platform 224 and route the transaction to them. Accordingly, a single point of integration is used, and a simple payload may be sent to process the transaction in an application programming interface (API) fashion.

In one embodiment, in order to incorporate the segmented platform 224, the segmented platform 224 may be updated by segmenting/updating a previously single activity platform to now a more robust and reconfigurable platform that enables not only the processing of the single activity but also provides a broader platform that becomes accessible to other tenants. That is to say, a platform that was previously used as a standalone for processing a single activity is segmented to provide more general processing. For example, a consumer platform (e.g., for money transfers) which is specifically designed for consumer transactions may be modified and segmented for use as a broader disbursement platform. In particular, a peer-to-peer platform (e.g., Xoom) may now be segmented and extended for use and to work with an entire enterprise (e.g., PayPal).

Figure 3:
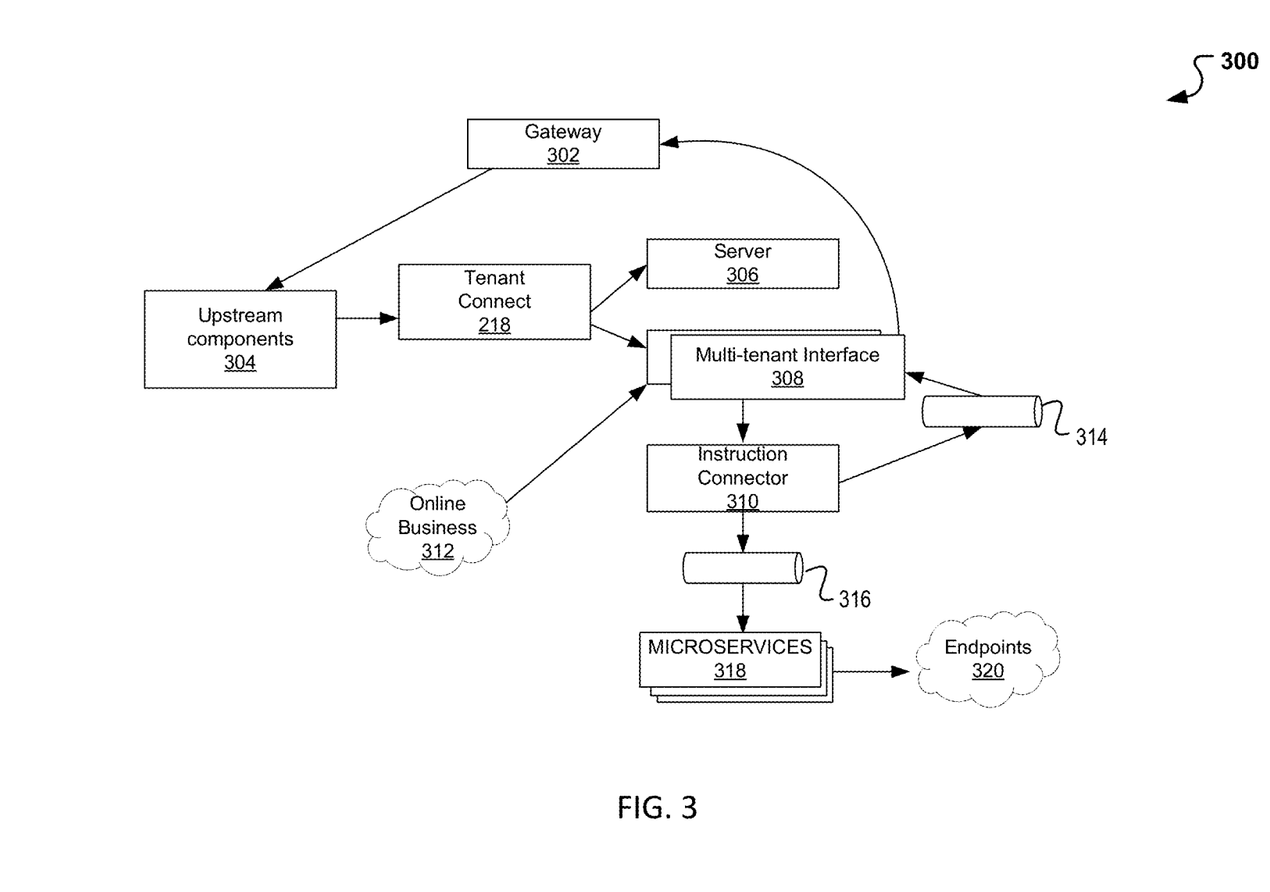
FIG. 3 illustrates an exemplary segmented subnetwork platform mapping to the network system.

Turning next to FIG. 3, an exemplary plugin 300 of the segmented platform 224 to the extended network 222 is presented. In particular, FIG. 3 illustrates how the segmented platform 224 is updated with previous dependencies decoupled, enabling subnetwork platform mapping to the extended network system. As previously indicated, an interface component or plug-in architecture (e.g., tenant connect mechanism 218) may be used to plug in a segmented platform 224 to an extended network 222. The use of the tenant connect mechanism 218 enables the access to and use of the segmented platform for processing transactions. As such, as updates on transactions that are processed by the segmented platform 224 occur, the updates may be communicated back from the multi-tenant interface 308 through a gateway 302 to upstream component 304 including transaction technology 220 within the extended network 222.

Thus, as the segmented network processes transactions, the multi-tenant interface 308 may communicate with the extended network 222 through network notifications and also as a means for communicating the requests arriving through API calls and the tenant connect mechanism 218 for processing through the segmented platform 224. Note that in order for the segmented platform to operate with the extended network, updates, modifications, and additions are made to the processing platform for correct functionality.

In one embodiment, the segmented platform 224 is introduced as a processor which utilizes a standard interface (multi-tenant interface 308) for the interaction to occur between the plugin architecture (e.g., extended network) and the segmented platform 224. The segmented platform 224 is further created to be backwards compatible with the extended network 222, such that a new gateway is created which conforms to the new standard. In other words, a new segmented platform 224 is introduced which severs and segments its prior activity processing (e.g., P2P online business 312) to a more universal platform that conforms to the plug-in standard. Thus, in one example, a previously isolated processor platform dedicated to consumer transfers is now a more standard platform available for use in merchant business, consumer business, and both online and offline.

To enable such standardization, the use of a stream-processing software platform is used for event streaming of updates. Hence, between the multi-tenant interface 308 and the instruction connector 310 which is where core transaction processing and routing occurs, this new streaming platform 314 is added. The streaming platform 314 provides a scalable solution as traffic flow changes with the growth of new partnerships that will be introduced by the extended network. Thus, the segmented platform 224 enables the introduction of a more open and event driven architecture.

Next, as the instruction connector 310 processes and routes incoming events, a processing message bus 316 may provide the pathway for the incoming messages to be received by one of a series of microservices 318 each of which contains a specialized integration with an individual financial institution or processor and fulfills financial transactions with the institution's corresponding set of endpoints. Each microservice 318 isolates an individual financial integration from all others, facilitating availability of other integrations when an individual integration suffers outages or maintenance. Thus, the microservices integration component 318 enables the breakdown of the transactions into smaller more consumable microservices tailored for the specific institution (e.g., bank)

Note that further to the introduction of the streaming platform 314 as a lateral platform, the streaming platform 314 may be added as direct conduit between the multi-tenant interface and the instruction connector 310. Note that furthermore, other components and processes may be added or removed from the segmented platform to enable compatible processing and communication with the extended network 222. Thus, the interface standardization, introduction of microservices integration, and the use of the streaming platform provide a novel segmented platform 224 that enables its use as a plugin to the extended network 222.

Figure 4:
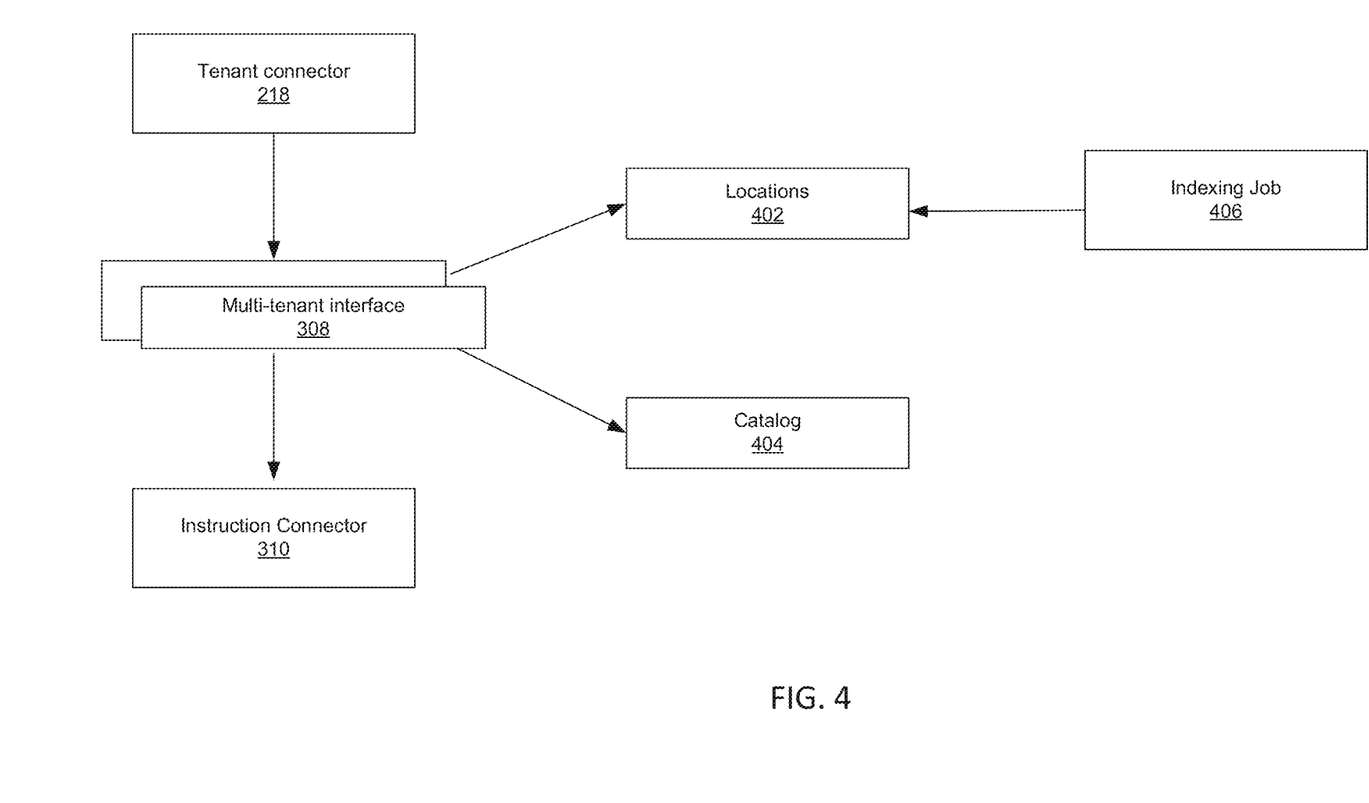
FIG. 4 illustrates an exemplary instrument mapping using the segmented subnetwork platform.

Turning next to FIG. 4, instrument mapping using the segmented platform 224 is presented. In particular, FIG. 4 is presented illustrating the use of the standardized instrument definitions and forms established with the extended network 222 for use by all processors. Recall that, each segmented platform 224 may maintain and include information about its affiliates or partners in various forms and with varying information. To account for the varying information, a standardized and globally relevant form was introduced in above an in conjunction with FIG. 2, generated and maintained by the forms component or datastore 226 for use by all participants or processors of the extended network 222. As such, when a new instrument is being added to function for use as a cross-functional standard account instrument in the segmented platform 224, the standardized form and information will be used and received by the tenant connector 218 which interfaces with the extended network 222. At receipt, the multi-tenant interface 308 operates as a reverse lookup technology which enables the intake of the standardized information and translates it into a form that is acceptable to the segmented platform 224. That is to say, the standardized instrument form received is translated by the segmented platform 224 so that the particular details used for processing are retrieved as necessary. Notice that because a standardized form is now used, other processors which use and have other non-standard methods for communicating over APIs can now map instruments to the corresponding segmented platform 224. Thus, volume processing and instrument mapping becomes available to any segmented platform 224 which is added or later acquired.

As such, as the information translated instrument, entity, and other proprietary details for a given partnership may be obtained for processing. Accordingly, upon receipt of the native form from at the multi-tenant interface 308, mapping to the segmented platform's 224 specific instruction ID at the locations component 402 and institution details (e.g., tracking, provider, attribute information, etc.) at the catalog component 402 may occur. Notice that additionally job indexing component 406 may also be available and used for the addition and inclusion of other locations which may not be available at the locations component 402. Additionally, or alternatively, the jobs indexing component 406 may be extended to include other capabilities and institution details as additional institutions, locations, and/or other details are introduced by either the segmented component 224 and/or the extended network 222. Once mapping is complete, the processing continues to the instruction connector 310 where core transaction processing and routing occurs.

Note that in addition to the introduction of a standardized form for adding new instruments to the platform, standardizations may also exist for providing notifications and accounting. That is to say, at the segmented platform 224, as transactions occur, notifications and status changes may be provided to the extended network 222. These notifications (from any segmented platform 224) may use the same notification API in order to have uniform communication between processors regardless of the segmented network 224 used. That is to say, a standard inbound and outbound API may be implemented as part of the network where status mapping and changes may be provided. Accordingly, a standard form for providing notifications may exist while necessitating a one-time integration.

Figure 5:
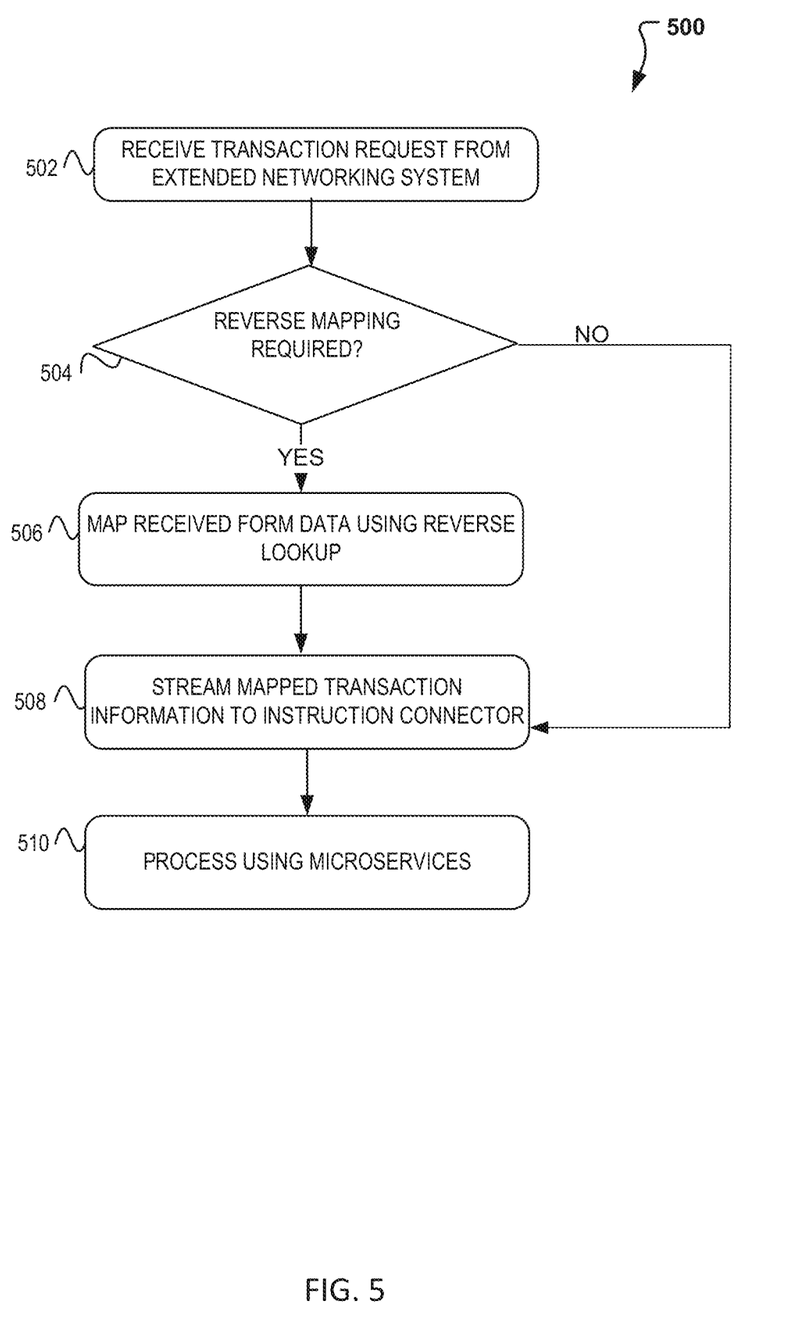
FIG. 5 illustrate flow diagrams illustrating operations for enabling the segmentation of the processor architecture platform.

Similarly, a standard plug-in may also be used to account for all activity or transactions processed by the segmented platform 224. Thus, as the end of a time period occurs, the segmented platform 224 is able to reconcile with all the institutions or entities that it is associated with. In other words, the segmented platform 224 is able to communicate with each tenant and handle the full reconciliation process in a standard and encapsulated manner for all institutions. FIG. 5 illustrate example process 500 for processing a transaction as may be implemented using the segmented platform in segmented platform 224 of FIG. 2. In particular, FIG. 5 illustrates a flow diagram illustrating operations for processing using the segmented platform with a previously mapped instrument.

In FIG. 5, according to some embodiments, process 500 may include one or more of operations 502-510, which may be implemented, at least in part, in the form of executable code stored on a non-transitory, tangible, machine readable media that, when run on one or more hardware processors, may cause a system to perform one or more of the operations 502-510.

Process 500 may begin with operation 502, where a request may be received at an extended network and transmitted for processing at the segmented platform. The request may come in the form of a standard API call received at a multi-tenant interface from the tenant connect component. As has been described, the request may be received in standard form as previously generated and maintained at a form's component or datastore for use by all participants or processors of the extended network. To maintain, capture, and determine what information exists and is available at each of the segmented platforms, curators may be used to identify the various fields associated with each platform and exposed to the extended network at the forms component or datastore. Accordingly, the fields used in the standard from may require mapping at the receipt of the segmented platform. As such, at operation 504, a decision is made as whether or not reverse mapping is needed prior to the processing of the transaction. If it is determined that no mapping is needed, then process 500 may continue to operation 508. However, if mapping is indeed needed, then process 504 continues to operation 506. At operation 506, mapping of the form data occurs. Mapping of the form data thus, may include the reverse lookup of data received wherein a correspond setting, parameter, entity, ID, property, or the like for use and needed by the segmented platform is identified. For example, consider a consumer payment processing platform, this platform may necessitate entries such as the institution ID, location, tracking number, provider, attributes, and the like. Therefore, in receiving the form data, these entries would be extracted or otherwise looked up based on the form data received.

Once mapping has occurred, process 500 continues to operation 508. At operation 508, the mapped data is streamed to the instruction connector. As previously defined, the instruction connector may be the apparatus used for core transaction processing and routing. Because the novel segmented platform introduced has the capacity to operate widely with multiple endpoints and institutions, a microservices process was introduced for the processing as an integration of microservices to the supported platform endpoints. Thus, the processing of the transaction request is concluded at operation 510.

Note that further to the processing, as previously indicated, reconciliation and status updates can also be completed and updated to the extended network using standardized notifications and plugins. Also note that 500 may include more or less operations. Operations 502-510 and are for exemplary purposes and the order and number of operations may be modified. For example, updates, statuses may occur during the processing by the instruction connector. Accordingly, payment transactions and other transactional data referenced here is used here for exemplary purposes.

Figure 6:
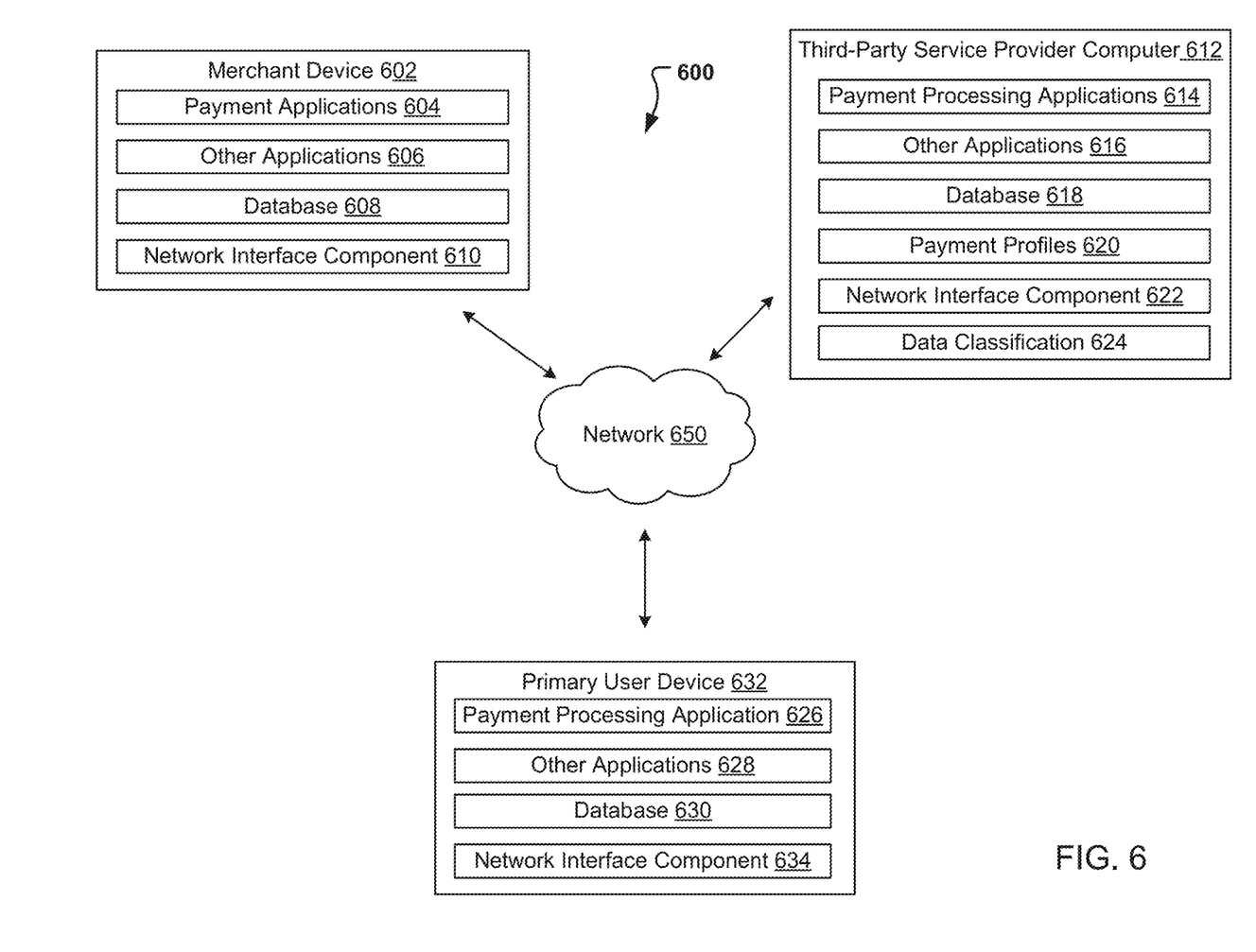
FIG. 6 illustrates a block diagram of a communication between systems used in conjunction with the processor architecture platform.

FIG. 6 is a block diagram of a networked system 600 for implementing the processes described herein, according to an embodiment. In particular, FIG. 6 illustrates a block diagram of a system 600 for processing a transaction using a segmented platform. As shown, system 600 may include or implement a plurality of devices, computers, servers, and/or software components that operate to perform various methodologies in accordance with the described embodiments. It will be appreciated that the devices, computers, and/or servers illustrated in FIG. 6 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 600 includes a merchant/vendor device 602, a primary user device 632, a third-party service provider computer 612 in communication over a network 650. These devices 602, 632, and 612 are exemplary devices that may interact during the request to process a transaction.

The merchant device 602, primary user device 632, and the third-party service provider computer 612 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 600, and/or accessible over network 650.

The merchant device 602 may be implemented as a communication device that may utilize appropriate hardware and software configured for wired and/or wireless communication with the primary user device 632 and third-party service provider computer 612. For example, the merchant device 602 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 602 may correspond to and be utilized by a user, such as an employee of a merchant and/or another person authorized by the merchant, or independently as a stand-alone system.

The merchant device 602 may include one or more payment applications 604, other applications 606, a database 608, and a network interface component 610. The payment applications 604 and other applications 606 may correspond to executable processes, procedures, and/or applications with associated hardware. In other embodiments, merchant device 602 may include additional or different components having specialized hardware and/or software to perform operations associated with the payment applications 604 and/or the other applications 606.

The payment application 604 may facilitate financial transactions corresponding to the sale of goods and/or services offered by the merchant. For example, the payment application 604 may provide an interface for customers to purchase the goods or services and to receive customer payment information (e.g., customer credit card information). The payment application 604 may further transmit customer payment information to a payment processor (e.g., such as a payment processor corresponding to the third-party service provider computer 612) to process the customer payment information. The payment application 604 may also facilitate other types of financial transactions such as banking, online payments, money transfer, and/or the like.

The merchant device 602 may execute the other applications 606 to perform various other tasks and/or operations corresponding to the merchant device 602. For example, the other applications 606 may include security applications for implementing client-side security features, programmatic client applications for interfacing with appropriate application programming interfaces (APIs) over network 650, or other types of applications. In various embodiments, the other applications 606 may include social networking applications. Additionally, the other applications 606 may include device interfaces and other display components that may receive input and/or output information. For example, the other applications 606 may include a graphical user interface (GUI) configured to provide an interface to the user.

The merchant device 602 may further include a database 608, which may be stored in a memory and/or other storage device of the merchant device 602. The database 608 may include, for example, identifiers (IDs) such as operating system registry entries, cookies associated with the payment application 604 and/or other applications 606, IDs associated with hardware of the network interface component 610, IDs used for payment/user/device authentication or identification, and/or other appropriate IDs. The database 608 may also include information corresponding to one or purchase transactions of customers who have purchased goods or services from the merchant, browsing histories of the customers, or other types of customer information. In certain embodiments, the merchant device 602 may also include information and IDs corresponding to payments for tracking the transaction and operations associated with the transaction generated or with another user, a primary user device 632 and/or the third-party service provider computer 612.

The merchant device 602 may also include at least one network interface component 610 configured to communicate with various other devices such as the primary user device 132, and/or the third-party service provider computer 612. In various embodiments, network interface component

610 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 612 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 612 may be associated with a user of the primary device 632. As such, the third-party service provider computer 612 includes one or more payment processing applications 614, which may be configured to process payment information received from the merchant device 602 or from a selection at the primary user device 632. In addition, the payment processing services can be tied to a processing system like device 102, 202-204 which can aid in transaction post-processing. For example, a payment application 604 (e.g., application 206) of the merchant device 602 may receive payment information from a customer to purchase a service or good offered by the merchant. Upon receipt of the payment information, the payment application 604 may transmit the payment information to the third-party service provider computer 612. The payment processing application (or third-party payment application system) 614 of the third-party service provider computer 612 may receive and process the payment information.

The third-party service provider computer 612 may execute the other applications 616 to perform various other tasks and/or operations corresponding to the third-party service provider computer 612. For example, the other applications 616 may include security applications for implementing client-side security features, programmatic client applications for interfacing with appropriate APIs over the network 650, or other types of applications. The other applications 616 may also include additional communication applications, such as email, texting, voice, and IM applications that enable communication of emails, calls, texts, and other notifications through the network 650. In various embodiments, the other applications 616 may include location detection applications, such as a mapping, compass, and/or GPS applications, which may be used to determine a location of the third-party service provider computer 612. Additionally, the other applications 616 may include device interfaces and other display components that may receive input and/or output information. For example, the other applications 616 may include a GUI configured to provide an interface to one or more users.

The third-party service provider computer 612 may further include a database 618, which may be stored in a memory and/or other storage device of the third-party service provider computer 612. The database 618 may include, for example, IDs such as operating system registry entries, cookies associated with the payment processing application 614 and/or other the applications 616, IDs associated with hardware of the network interface component 622, IDs used for payment/user/device authentication or identification, transaction IDs, IDs for tracking transactions, (e.g., root payment IDs), and/or other appropriate IDs.

The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 620 may include payment information corresponding to other customers of the merchant and/or other merchants associated with the user.

The third-party service provider computer 612 may also store a set of payment tokens corresponding to the set of payment profiles 620. For example, each payment profile of the set of payment profiles 620 may be associated with a corresponding payment token from the set of payment tokens. In some embodiments, each payment profile may include a corresponding payment token from the set of payment tokens. The set of payment tokens may be particular to the third-party service provider computer 612 (e.g., computers from other service providers may be unable to use the set of payment tokens) and may enable the merchant device 602 to more securely process payment transactions with the third-party service provider computer 612. For example, in order to process a payment transaction that involves a credit card number associated with a particular payment profile, the third-party service provider computer 612 may provide the merchant device 602 with a particular payment token that is different from the credit card number. The merchant device 602 may use the particular payment token to process the payment transaction instead of the credit card number. Further, the merchant device 602 may store and associate the particular payment token with the particular payment profile instead of the credit card number, thereby protecting the credit card number from being stolen in a potential security breach of the merchant device 602.

In various embodiments, the third-party service provider computer 612 also includes at least one network interface component 622 that is configured to communicate with the merchant device 602, the primary user device 632, and/or the secondary user device 636 via the network 650. The third-party provider computer 612, may also include a data classification component 624 that may be used for communicating with the extended network and for the receipt of information such that a segmented platform is available for use in a transaction.

The primary user device 632 may be implemented as a communication device that may utilize appropriate hardware and software configured for wired and/or wireless communication with the merchant device 602 and third-party service provider computer 612. The primary user device 632, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 632 may be mobile device communicating with wearable device (or secondary user device), merchant device 602, or directly with the third-party service provider system 612.

The primary user device 632 may include a payment processing application 626 that may be used as a digital wallet that can communicate with a merchant device 602, a secondary user device, and/or third party service provider 612 for purchasing and transacting. The payment processing application 626, can work jointly with database 630 for retrieving bank account information, user accounts, security codes, identifiers, tokens, etc., that may be associated with various merchant locations, transactions, etc. Similarly, the payment processing application, can also provide access the user profiles for determining which payment method, processing code, to use at a merchant location. Still further, the payment processing application can provide access to other platforms available for processing the payments, remittance, and other transactions.

The primary user device 632 may also include other applications 628 to perform various other tasks and/or operations corresponding to the primary user device 632. For example, the other applications 628 may facilitate communication with the merchant device 602, such as to receive an indication, from the merchant device 602, to switch payment processing services from the third-party service provider to the service provider. As another example, the other applications 628 may include security applications, application that enable designation of a primary interactive device, and applications that allow for web site searches (including access to merchant websites). The other applications 628 may also include additional communication applications, such as email, texting, voice, and IM applications that enable communication of emails, calls, texts, and other notifications through the network 650. In various embodiments, the other applications 628 may include location detection applications, such as a mapping, compass, and/or GPS applications, which may be used to determine a location of the primary user device 632. The other applications 628 may include social networking applications. Additionally, the other applications 628 may include device interfaces and other display components that may receive input and/or output information. For example, the other applications 628 may include a GUI configured to provide an interface to one or more users.

The primary user device 632 may further include a database 630, which may be stored in a memory and/or other storage device of the primary user device 632. The database 630 may include, for example, identifiers (IDs) such as operating system registry entries, cookies associated with a web browser and/or the other applications 628, IDs associated with hardware of the network interface component 634, IDs used for payment/user/device authentication or identification, bank information, merchant information, user accounts, and/or other appropriate IDs.

The primary user device 632 may also include at least one network interface component 634 configured to communicate with various other devices such as the merchant device 602 and/or the third-party service provider computer 612.

Note that although a primary user device 632, a third-party service provider computer 612, and merchant device 602 are illustrated, a credit card provider may also be included and used in communication with the third-party service provider computer 612 and/or merchant device 602 for performing an electronic transaction. Additionally, or alternatively, the merchant may be accessed digitally through a network over a computer website on the primary user device 632 and the merchant device may instead be the credit card provider used for processing the electronic transaction.

Figure 7:
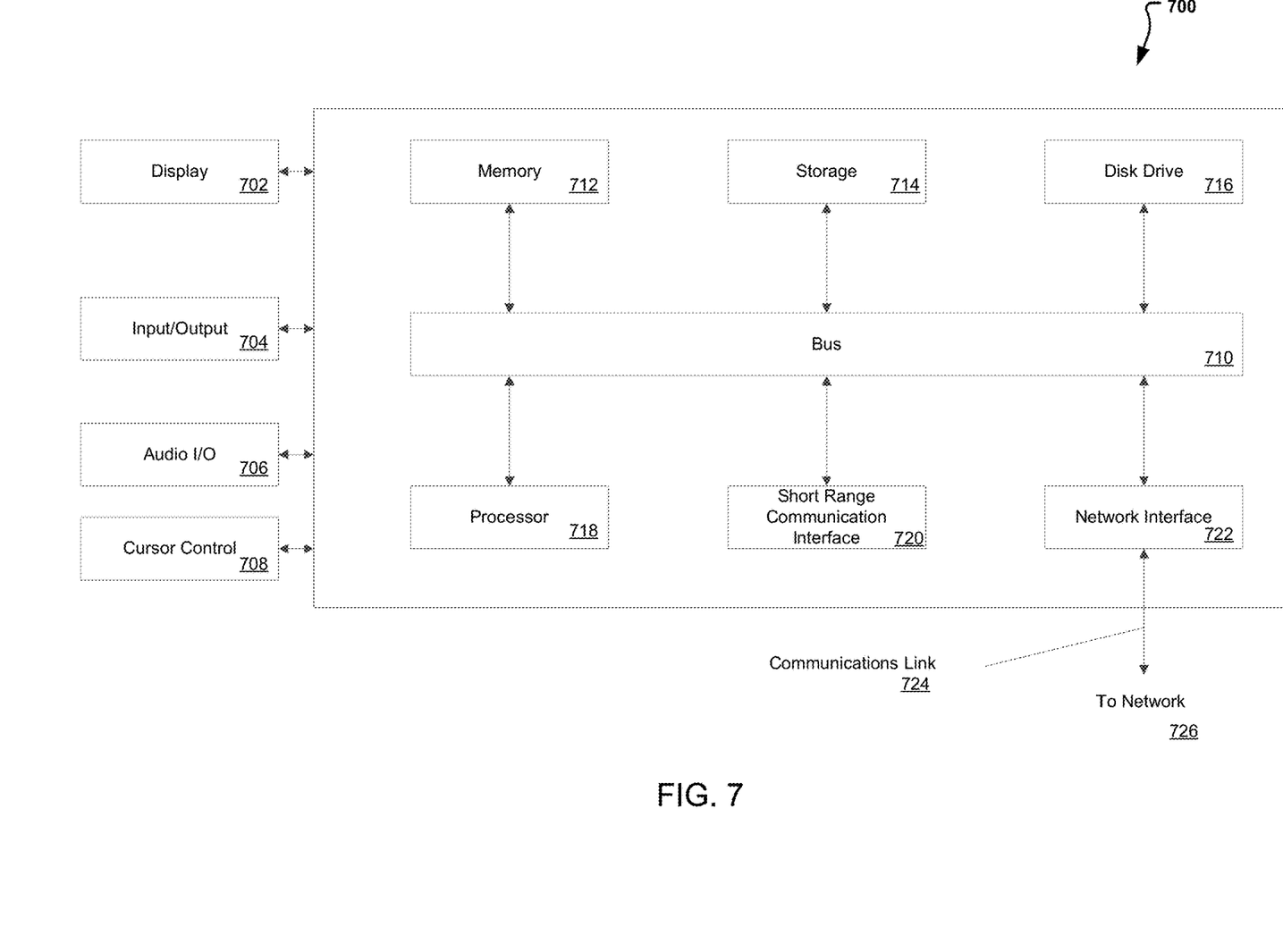
FIG. 7 illustrates an example block diagram of a computer system suitable for implementing one or more devices of the communication systems of FIGS. 1-6.

FIG. 7 illustrates an example computer system 700 in block diagram format suitable for implementing on one or more transactions and allocations as described above and in conjunction with FIGS. 1-6. In various implementations, a device that includes computer system 700 may comprise a computing device (e.g., a smart or mobile device, a computing tablet, a personal computer, laptop, wearable device, PDA, server, etc.) that is capable of communicating with a network 726. A service provider and/or a content provider may utilize a network computing device (e.g., a network server or third-party service provider computer 612) capable of communicating with the network 726. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 may include an image sensor for capturing images and/or video, such as a complementary metal oxide semiconductor (CMOS) image sensor, and/or the like. An audio input/output component 706 may also be included to allow a user to use voice for inputting information by converting audio signals. Audio I/O component 706 may allow the user to hear audio. A transceiver or network interface 722 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712. Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., Wi-Fi, Bluetooth®, Bluetooth Low Energy (BLE), infrared, NFC, etc.).

Short range communications interface 720, in various embodiments, may be configured to detect other devices (e.g., primary user device 632, merchant device 602, etc.) with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short-range communications protocol, such as Wi-Fi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Components described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions; and
   a processor configured to execute the instructions to cause the system to perform operations comprising:
   generating a standardized form for a segmented platform at least in part via an automated machine processing of a plurality of fields associated with the segmented platform, the segmented platform comprising a peer-to-peer platform or a financial instrument platform, the segmented platform offering one or more capabilities lacking at an extended network;
   receiving, at the extended network, a request to process a transaction by the segmented platform;
   mapping, by a multi-tenant interface, form data associated with the standardized form, the form data being received in a communication between the extended network and the segmented platform, wherein the mapping includes a reverse data lookup that translates the standardized form into a form that is associated with the segmented platform;
   streaming, the mapped form data to an instruction connector for processing and routing; and processing, by an integration of microservices, the request to process the transaction using the streamed mapped data.

2. The system of claim 1:
wherein the request is received using a standardized application programming interface (API) call.

3. The system of claim 1, wherein the operations further comprise:
communicating an update from the multi-tenant interface through a gateway to the extended network.

4. The system of claim 1, wherein the form that is associated with the segment platform includes data entries that comprise an institution identification of the segmented platform, a location of the segmented platform, a tracking number of the segmented platform, a provider of the segmented platform, or an attribute of the segmented platform, and wherein the microservices include services associated with different institutions.

5. The system of claim 1, wherein the plurality of fields comprise a setting, a parameter, an entity identification, or a property for use by the segmented platform.

6. The system of claim 1, wherein the plurality of fields are stored and exposed to the extended network at a datastore.

7. The system of claim 1, wherein the operations further comprise:
exporting a processing activity in the segmented platform as imported data back into the extended network.

8. A method, comprising:
generating a standardized form for a segmented platform at least in part via an automated machine processing of a plurality of fields associated with the segmented platform, the segmented platform comprising a peer-to-peer platform or a financial instrument platform, the segmented platform offering one or more capabilities lacking at an extended network;
receiving, at the extended network, a request to process a transaction by the segmented platform;
mapping, by a multi-tenant interface, form data associated with the standardized form, the form data being received in a communication between the extended network and the segmented platform, wherein the mapping includes a reverse data lookup that translates the standardized form into a form that is associated with the segmented platform;
streaming the mapped form data to an instruction connector for processing and routing; and
processing, by an integration of microservices, the request to process the transaction using the streamed mapped data.

9. The method of claim 8, wherein the form that is associated with the segment platform includes data entries that comprise an institution identification of the segmented platform, a location of the segmented platform, a tracking number of the segmented platform, a provider of the segmented platform, or an attribute of the segmented platform.

10. The method of claim 8, wherein the plurality of fields are stored and exposed to the extended network at a datastore.

11. The method of claim 8,
wherein the request is received using a standardized application programming interface (API) call.

12. The method of claim 8, further comprising:
communicating an update from the multi-tenant interface through a gateway to the extended network.

13. The method of claim 8, wherein the microservices include services associated with different institutions.

14. The method of claim 8, wherein the plurality of fields comprise a setting, a parameter, an entity identification, or a property for use by the segmented platform.

15. A non-transitory machine-readable medium having instructions stored thereon, the instructions executable to cause performance of operations comprising:
generating a standardized form for a segmented platform at least in part via an automated machine processing of a plurality of fields associated with the segmented platform, the segmented platform comprising a peer-to-peer platform or a financial instrument platform, the segmented platform offering one or more capabilities lacking at an extended network;
receiving, at the extended network, a request to process a transaction by the segmented platform;
mapping, by a multi-tenant interface, form data associated with the standardized form, the form data being received in a communication between the extended network and the segmented platform, wherein the mapping includes a reverse data lookup that translates the standardized form into a form that is associated with the segmented platform;
streaming the mapped form data to an instruction connector for processing and routing; and
processing, by an integration of microservices, the request to process the transaction using the streamed mapped data.

16. The non-transitory machine-readable medium of claim 15,
wherein the request is received using a standardized application programming interface (API) call.

17. The non-transitory machine-readable medium of claim 15, wherein the operations further comprise:
communicating an update from the multi-tenant interface through a gateway to the extended network.

18. The non-transitory machine-readable medium of claim 15, wherein the form that is associated with the segment platform includes data entries that comprise an institution identification of the segmented platform, a location of the segmented platform, a tracking number of the segmented platform, a provider of the segmented platform, or an attribute of the segmented platform.

19. The non-transitory machine-readable medium of claim 15, wherein the plurality of fields are stored and exposed to the extended network at a datastore.

20. The non-transitory machine-readable medium of claim 15, wherein the microservices include services associated with different institutions.

* * * * *